Dec. 26, 1933.  M. MIZUTA ET AL  1,941,182

FLASH POINT TESTING MACHINE

Filed Dec. 18, 1930

INVENTORS:—
Masakichi Mizuta
and
Teiji Yoshimura
By Alexander Powell
ATTORNEYS

Patented Dec. 26, 1933

1,941,182

UNITED STATES PATENT OFFICE 1,941,182

FLASH POINT TESTING MACHINE

Masakichi Mizuta, Marunouchi, Kojimachi-Ku, Tokyo, and Teiji Yoshimura, Okubo, Kashiwazaki - Machi, Kariha - Gun, Niigata - Ken, Japan, assignors to Nihon Sekiyu Kabushiki Kaisha, Tokyo, Japan, a corporation of Japan Application December 18, 1930, Serial No. 503,332, and in Japan December 30, 1929

2 Claims. (Cl. 73—50)

This invention relates to improvements in Pensky Martens' flash point testing machine, which comprises a double-walled oil-cup, and a conical inner casing for test oil put close to a flash nozzle, the space between the walls opposite the said casing being slightly enlarged to regulate the transmission of heat. The object thereof is to make it possible to find a flash point accurately and rapidly with a small quantity of test sample by diminishing the surface exposed to strong heat and thus preventing the decomposition of the test sample due to partial overheating.

Figure 2:
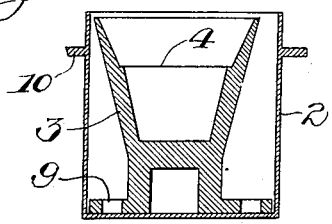
Figure 3:
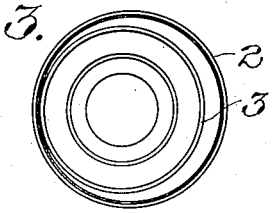
Figure 1:
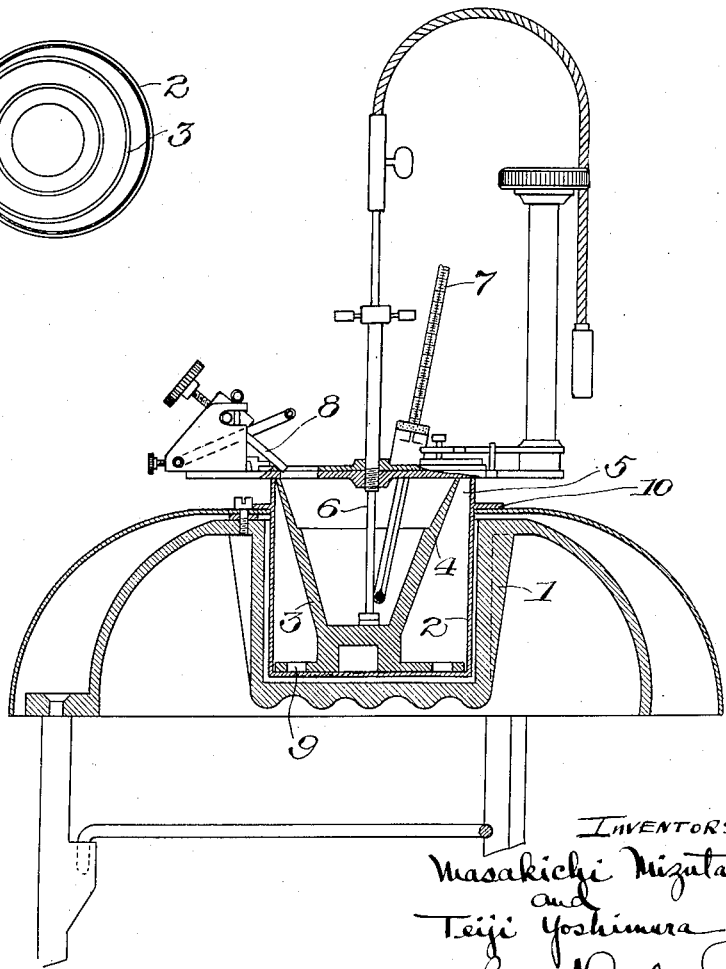

Referring to the accompanying drawing,

Figure 1 is a sectional elevation of the machine according to this invention;

Figure 2, a vertical section through the oil cup;

Figure 3, a plan of the same and

Figure 4:

Figure 4, a back view of the base of the inner casing.

In order to measure the ignition point of oil it is usual to use Pensky Martens' testing machine. However, with such a machine some 73—74 milli-litres of test sample is needed for a single test and to obtain the average value of two tests nearly 150 milli-litres is consumed. Consequently, it is impossible to perform the test of flash point when there is a very small quantity of test sample, for instance in testing the used lubricating oil or the like from the bearings or other parts of a machine during its operation. According to the present invention, the oil cup has a double wall and the inner casing has a conical shape and is put specially close to the flash nozzle. The space between the walls on the opposite side is enlarged. Thus, by making the inner casing in a conical form, the surface to be exposed to strong heat is considerably diminished to receive heat uniformly, whereby the decomposition of oil due to partial over-heating is prevented and thus the flash point can be found rapidly and accurately by using only about 16 milli-litres of sample for one test. Also, by putting the inner casing close to the flash nozzle the hot air current outside the inner casing due to heating is stopped on the side of the flash nozzle and the test flame is prevented from fluttering. Furthermore, the oil vapor is not affected by the temperature of the heating gas so that the examination can be made accurately.

The following is the explanation of this invention with reference to the accompanying drawing:—

An oil cup to be inserted in the frame 1 such as of Pensky Martens' test machine consists of an outer casing 2 having shoulder 10, and a conical inner casing 3 which has its base pierced with perforations 2, the said inner casing having on its inner wall a shoulder 4 to indicate the fixed amount of test sample (10 milli-litres at ordinary temperature) and put close to the flash nozzle 8, while the space 5 between the walls on the opposite side is slightly enlarged. In the said inner casing there is provided a single-bladed stirrer 6 and a thermometer 7.

The following is the manner of using this invention:—

Insert the inner casing into the outer casing as shown in Figure 1 as is the case with a common ignition point testing machine and make the upper edge of the inclining side of the inner casing contact closely with the upper edge of the outer casing on the side of the flash nozzle. Provide the lid and thermometer and then ascertain whether the stirring, the facing downward of test flame, etc. can be performed satisfactorily or not. After this, light the test flame, the length of which is nearly 5 millimeters. Next, about 10 milli-litres of test oil is poured into the inner casing at room temperature by using a pipette (at atmospheric temperature) up to the shoulder on the inner wall and the oil is heated after putting the lid on the said casing. As to the speed of heating, the temperature is raised at 6–10° C. per minute up to about 20° C. below the expected flash point for test oil of flash point over 100° C.; and then at 4–5° C. per minute over it. The stirring is performed when the temperature of the oil has reached over 100° C. and thus when it approaches the expected flash point, turn down the test flame and test the ignition.

In the preliminary test the facing-down of the test flame is performed at every 5 degrees from about 30° C. below the expected flash point and at every 2 degrees from 10° C. below the flash point. From the second time it is done at every 2 degrees from 15° C. below the ignition point obtained in the preliminary test and at every 1 degree from 5° C. below the flash point, and as soon as the first flash is observed on the surface of the oil, the temperature at that time is the flash point. By the way, when the test flame is turned down, the machine must not be left open for more than two seconds. Of course, the stirring must then be stopped.

According to the present invention, only a very small quantity of test sample is needed, say as little as about 10 milli-litres per test, but the result of the measurement is very accurate. The following is the comparison of this invention with Pensky Martens' machine:—

| Test sample | Flash point when the machine according to this invention is used. | | | | Pensky Martens' testing machine. | | | |
|---|---|---|---|---|---|---|---|---|
| | 1st time | 2nd time | 3rd time | Difference between the highest and lowest points | 1st time | 2nd time | 3rd time | Difference between the highest and lowest points |
| Cylinder oil No. 1 | 290.0 | 290.5 | 290.5 | 0.5 | 294.0 | 294.0 | 296.0 | 2.0 |
| Oil No. 2 | 258.5 | 258.5 | 258.5 | 0 | 258.0 | | | |
| Oil No. 3 | 195 | 195 | 195.0 | 0 | 195 | 194 | 194. | 1.0 |
| Machine oil | 161.5 | 162.0 | 161.5 | 0.5 | 161.0 | 160.0 | 161.0 | 1.0 |
| Transformer oil | 137.0 | 137.5 | 137.0 | 0.5 | 135.5 | 135.0 | 136.0 | 0.5 |

We claim:

1. Apparatus for testing the flash point of oil, comprising a cylindrical outer casing; an inverted conical inner casing, for receiving the oil to be tested, eccentrically disposed within the walls of the outer casing and having its periphery substantially tangent thereof; and a flash nozzle disposed adjacent the point of tangency of the casings.

2. Apparatus for testing the flash point of oil comprising an outer cylindrical casing having an external supporting flange; an inverted conical inner casing, for receiving the oil to be tested, eccentrically disposed within the walls of the outer casing and having its periphery substantially tangent thereto, whereby ascendence of hot air currents is prevented between the inner and outer casings at the point of tangency, and a flash nozzle disposed adjacent the point of tangency of the casings.

MASAKICHI MIZUTA.
TEIJI YOSHIMURA.